United States Patent [19]
Schmidt

[11] Patent Number: 6,045,477
[45] Date of Patent: Apr. 4, 2000

[54] CONTINUOUSLY VARIABLE MULTI-RANGE POWERTRAIN WITH A GEARED NEUTRAL

[75] Inventor: Michael Roland Schmidt, Carmel, Ind.

[73] Assignee: General Motors Corporation, Detroit, Mich.

[21] Appl. No.: 09/332,408

[22] Filed: Jun. 14, 1999

[51] Int. Cl.$^7$ ................................................. F16H 37/02
[52] U.S. Cl. .......................................... 475/207; 475/216
[58] Field of Search ................................... 475/216, 215, 475/207, 192, 214

[56] References Cited

U.S. PATENT DOCUMENTS

| | | | |
|---|---|---|---|
| 5,564,998 | 10/1996 | Fellows | 475/216 |
| 5,888,160 | 3/1999 | Miyata et al. | 475/216 |
| 5,931,760 | 8/1999 | Beim et al. | 475/207 |

*Primary Examiner*—Sherry L. Estremsky
*Attorney, Agent, or Firm*—Dean L. Ellis

[57] ABSTRACT

A powertrain has an engine, a multi-range continuously variable transmission (CVT) and a final drive mechanism. The CVT has a continuously variable unit (CVU) and a planetary gear set. A plurality of friction devices that are selectively connectable to establish three forward ranges and one reverse range wherein the CVU is effective to provide infinitely variable ratios between the engine and the final drive mechanism. One friction device is engaged during a geared neutral condition, a first forward range and a reverse range. The neutral condition is established by setting the CVU at a predetermined ratio. The reverse range is operated by changing the CVU ratio toward a maximum underdrive ratio from the neutral condition and the first forward range is operated by changing the CVU ratio toward a maximum overdrive ratio. The second and third forward ranges are established by synchronously interchanging friction devices.

5 Claims, 6 Drawing Sheets

CONTINUOUSLY VARIABLE MULTI-RANGE POWERTRAIN WITH A GEARED NEUTRAL

TECHNICAL FIELD

This invention relates to continuously variable multi-range transmissions having a geared neutral and more particularly to such transmissions having an input power split in at least the lowest and highest of the ranges.

BACKGROUND OF THE INVENTION

Continuously variable transmissions are employed in powertrains between an engine and final drive gearing to improve the operating range of the engine. Also these transmissions permit the engine to operate at the most efficient fuel consumption. Once the engine operating speed is achieved, the output speed of the vehicle can be further adjusted by changing the ratio in the transmission. With a continuously variable transmission, small but effective ratio changes can be attained. This is in contrast to a fixed gear ratio unit where any ratio changes are step values. This requires the engine to operate through the full speed range for each transmission ratio.

One drawback of the continuously variable transmission, as compared with a planetary gear arrangement, is that a true neutral condition cannot be achieved. This requires that a starting device, such as a clutch or fluid coupling, also be incorporated into the powertrain. This drawback is at least partially overcome by incorporating a planetary gear set between the engine and the transmission. The planetary gear set will permit a geared neutral condition under which the variable transmission ratio is set to take advantage of the planetary gear ratio when the variable members of the transmission are connected to respective ones of the planetary transmission and the transmission output shaft is connected to the third planetary member.

Geared neutral transmissions include a continuously variable unit (CVU) combined with a planetary gear unit. The CVU most widely proposed for such transmissions is of the belt and pulley type. One such geared neutral belt and pulley variable transmission is disclosed in U.S. Pat. No. 4,644,820 issued to Macey et al on Feb. 24, 1987. The planetary gear unit is effectively connected between the input and output components of the CVU to permit the input and output components to rotate while the output of the planetary gear unit is stationary. These transmissions provide a power split in the low or launch range, immediately following neutral, however when these transmissions have a second range, all of the power from the engine passes through the CVU which reduces the overall efficiency and power capabilities of the transmissions.

SUMMARY OF THE INVENTION

It is an object of the present invention to provide an improved multi-range continuously variable transmission (CVT) having a geared neutral and a power split in at least one range other than the first range.

In one aspect of the present invention, an input power split is provided in the third range of a three range CVT. In another aspect of the present invention, an input power split is provided in both the second and third ranges of a multi-range CVT.

In yet another aspect of the present invention, an input power split is provided in the first, second and third ranges of a multi-range CVT. In still another aspect of the present invention, a multi-range CVT having a geared neutral has a gearing associated therewith which bypasses a portion of the input power during at least one range other than the low range.

In yet still another aspect of the present invention, the CVT is not exposed to full engine power in two of three ranges. In a further aspect of the present invention, a planetary gear set is disposed in power flow arrangement between the CVT and a power source to by pass a portion of the power from the power source around the CVT.

DESCRIPTION OF AN EXEMPLARY EMBODIMENT

Figure 1:
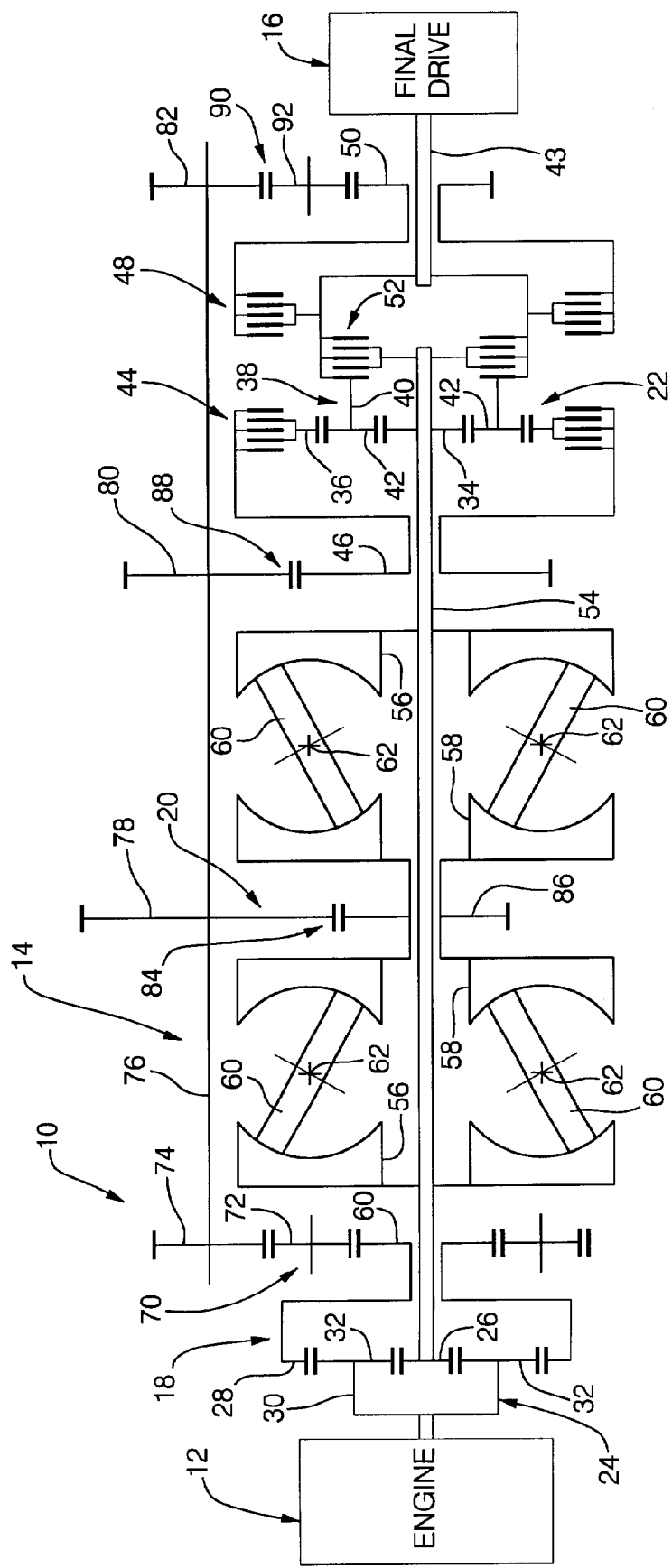
FIG. 1 is a schematic representation of one embodiment of a powertrain incorporating the present invention.

A powertrain 10, shown in FIG. 1, has a power source, such as an engine or prime mover, 12, a multi-range continuously variable transmission (CVT) 14 and a final drive 16. The power source 12 and the final drive 16 are conventional mechanisms which are well-known in the art. The CVT 14 includes an input planetary gear set 18, a continuously variable unit (CVU) 20 and a ratio planetary gear set 22. The input planetary gear set 18 includes a planet carrier assembly member 24, a sun gear member 26 and a ring gear member 28. The carrier member 24 has a cage mechanism 30 on which is rotatably supported a plurality of pinion gear members 32 that are disposed in meshing relation with sun gear member 26 and the ring gear member 28.

The ratio planetary gear set 22 includes a sun gear member 34, a ring gear member 36 and a planet carrier assembly member 38 that is comprised of a cage 40 on which is rotatably mounted a plurality of pinion gear members 42 disposed in meshing relation with the sun gear member 34 and the ring gear member 36. The cage 40 of the carrier assembly member is drivingly connected with the final drive mechanism 16 through a shaft 43.

A first selectively engageable friction device 44 is selectively connectable between the ring gear member and a transfer gear member 46. A second selectively engageable friction device 48 is selectively connectable between the carrier assembly member 38 and a transfer gear 50. A third selectively engageable friction device 52 is selectively connectable between the carrier assembly member 38 and a shaft member 54. The friction devices 44, 48 and 52 are preferably conventional fluid operated multi-plate friction clutches. The design and control of these devices is well-known to those who practice the art of transmission design and manufacture.

The shaft member 54 is also connected with the sun gear member 26, the sun gear member 34 and a pair of first cone members 56 that are components of the CVU 20. The CVU 20 also includes a pair of second cone members 58 and a plurality of friction discs 60 that are frictionally engaged between opposed pairs of the first cone members 56 and second cone member 58 to frictional transfer power therebetween in a well-known manner. The CVU 20 is depicted as a toric type friction drive mechanism. Other frictional CVU types of mechanisms can also be utilized without departing from the spirit and scope of the invention. As the discs 60 are pivoted on their respective axes 62, the speed ratio between the cone members 56 and 58 will change.

At the position shown in FIG. 1, the discs 60 are engaging the inner diameter of the cones 58 and the outer diameter of the cones 56 such that the cones 58 will rotate faster than the cones 56. As the discs 60 are pivoted toward the outer diameter of the cones 58, they will move toward the inner diameter of the cones 56. The speed ratio between the cones 56 and 58 will approach one to one as the cones near alignment at the center of the cones 56 and 58. As the discs 60 are pivoted further toward the outer diameter of the cones 58, the cones 58 will rotate faster than the cones 56. For purposes of this discussion, the cone 58 will be considered the input side and the cone 56 will be considered the output side. As shown in FIG. 1, the maximum underdrive ratio is set. When the discs 60 are pivoted to engage the outer effective diameter of the cones 58, the maximum overdrive ratio is set. The ratio between these extremes is considered to vary by infinitesimal amounts. Thus the ratio of the CVU is considered to be infinitely variable between the maximum underdrive ratio and the maximum overdrive ratio. By way of example, the maximum underdrive ratio for the CVU 20 is approximately 2.75 and the maximum overdrive ratio is approximately 0.36.

The ring gear member 28 is continuously connected with a transfer gear 66 that is a member of a gear train 70 including an idler gear 72 and a transfer gear 74. The transfer gear 74 is drivingly connected with a shaft 76 that is drivingly connected with a plurality of transfer gears 78, 80 and 82. The transfer gear 78 is a member a gear train 84 which includes a transfer gear 86 that is connected with the cones 58. The transfer gear 80 is a member of a gear train 88 that includes the transfer gear 46. The transfer gear 82 is a member of a gear train 90 that includes an idler gear 92 and the transfer gear 50.

Figure 2:
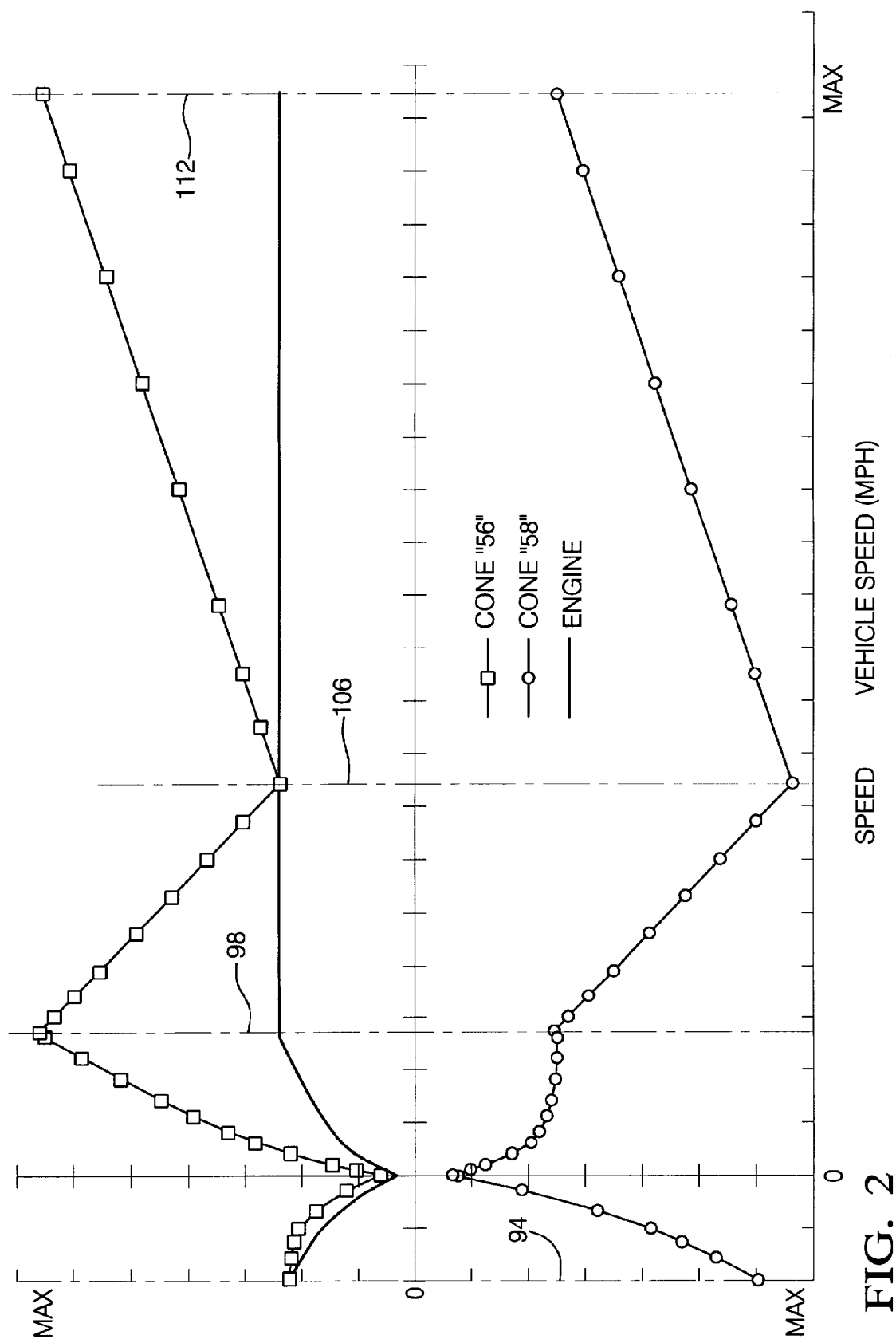
FIG. 2 is a graph depicting the speeds of relative components of the powertrain shown in FIG. 1.
Figure 3:
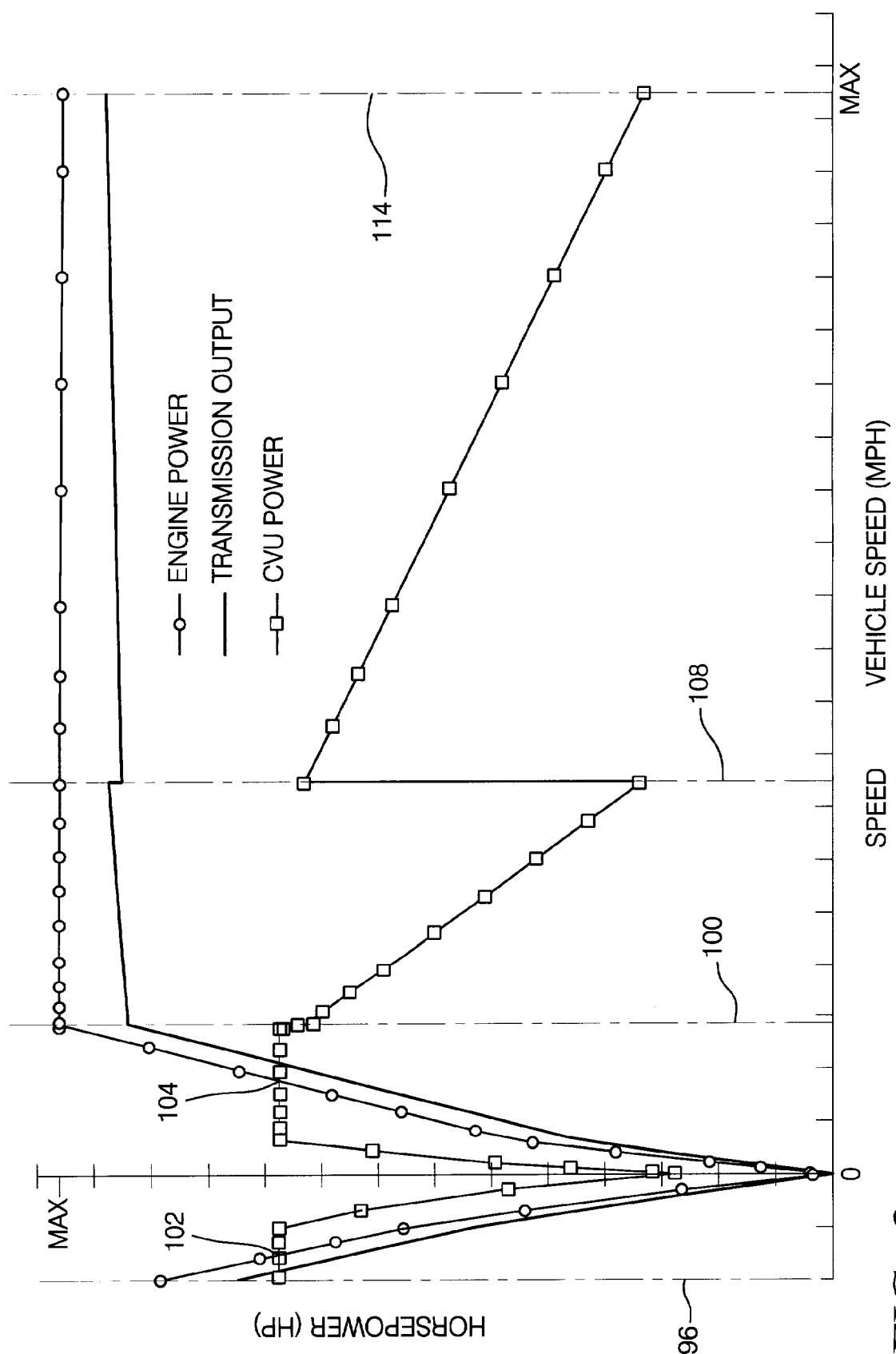
FIG. 3 is a graph depicting the power flow in the powertrain shown in FIG. 1.

The graphs shown in FIGS. 2 and 3 represent some of the operating characteristics of the powertrain 10 shown in FIG. 1. For the exemplary curves shown it is considered that the engine 12 has a maximum speed of 4800 rpm and maximum power of 330 Hp when operated at wide open throttle. Thus the curves depict the maximum design performance for the vehicle. For this example, the gear members are considered to have the number of teeth shown in the following table.

| Gear member | No. of teeth | Gear member | No. of teeth |
| --- | --- | --- | --- |
| Sun gear 26 | 33 | Ring gear 28 | 91 |
| Sun gear 34 | 24 | Ring gear 36 | 98 |
| Transfer gear 66 | 35 | Transfer gear 74 | 27 |
| Transfer gear 86 | 32 | Transfer gear 78 | 68 |
| Transfer gear 46 | 68 | Transfer gear 80 | 32 |
| Transfer gear 50 | 35 | Transfer gear 82 | 27 |

To condition the powertrain for both low forward and reverse operation, the CVU ratio is set at 1.10 and the friction device 44 is engaged. To increase the speed of the final drive, and therefore the vehicle, in the reverse direction, the speed of the engine is increased and the ratio of the CVU is changed toward the underdrive condition. The speed curves shown in FIG. 2 and the power curves shown in FIG. 3 are, as previously pointed out, at the full throttle condition. Therefore if less than full throttle is employed, the curves will be changed accordingly.

When the CVU ratio is at maximum underdrive and the engine is at full speed, the maximum reverse speed is reached at the line 94 in FIG. 2 and the maximum power is transmitted at line 96 in FIG. 3. During the reverse operation, the power flow from the engine 12 is split by the planetary gear set 18 such that a portion flows to the transfer gear train 70 and portion flows to the cones 56. The power flow through the gear train 70 is delivered to the ring gear member 36. The power at the cones 56 is delivered through the cones 58 and the transfer gear train 84 to the ring gear member 36. A portion of the power at the ring gear member 36 is transferred to the sun gear member 34 and the remainder is transferred to the carrier assembly member 38. The power at the sun gear member 34 returns to the CVU 20 as reaction power in the planetary gear set 22. This is regenerated power. As can be seen in FIG. 3, the amount of power transmitted through the CVU 20 increases as the vehicle speed increases to a maximum value and thereafter remains constant. The difference between the engine power and the CVU 20 power, up to the point 102 is regenerated power. The difference between the engine power and the transmission output power is a power loss which is reflected in the overall efficiency of the powertrain.

To increase the vehicle speed in the forward direction, the ratio of the CVU is changed from 1.1 toward an overdrive ratio while the engine speed is increased. The vehicle output speed will increase toward the line 98 in FIG. 2 and the line 100 in FIG. 3. At this point, the ratio in the CVU will have reached the maximum overdrive ratio of 0.36. The cage 40 and the transfer gear 50 will be rotating at the same speed. This will permit the synchronous engagement of the friction device 48 while the friction device 44 is being disengaged. During the first forward range, the power flow from the engine 12 is split by the planetary gear set 18 for delivery to the sun gear 34 and the cone 58. The power at the cone 58 is transferred to the cone 56 and delivered to the sun gear 34. The ring gear 36 is a rotating reaction member, and as such, recirculates power to the cone 58. As in the reverse range, the first forward range incorporates power regeneration. The power curves shown in FIG. 3 illustrate this feature. The difference between the CVU 20 power and the engine power is the value of the regeneration power until the point 104 is reached.

The speed of the vehicle is increased in the second range by changing the ratio of the CVU 20 from the maximum overdrive ratio toward the maximum underdrive ratio. When the maximum underdrive ratio of 2.75 is achieved at line 106 in FIG. 2 and 108 in FIG. 3, the sun gear 34 and the cage 40 are rotating in unison such that the friction device 52 can be synchronously engaged. During the second forward range, the planetary gear set 18 divides the power for delivery to the cones 56 via the sun gear 26 and to the gear train 90 via the ring gear member 28. The power at the first cone 56 is transferred to the second cone 58 and transmitted to the gear train 84 where it is combined with the power that is transmitted through the ring gear 28. All of the power is delivered through the friction device 48 to the transmission output represented by the final drive 16.

During the third forward range operation with the friction device 52 engaged, the speed of the vehicle is increased by changing the ratio of the CVU 20 from the maximum underdrive at line 106 toward the maximum overdrive ratio. When the maximum overdrive ratio of 0.36 is reached, the vehicle will achieve the maximum design speed as represented by the line 112 in FIG. 2 and the line 114 in FIG. 3. The planetary also divides the engine power during the third range. A portion of the power is transferred through the sun gear 26 and shaft 54 to the friction device 52. The remainder of the power is transferred through the ring gear member 28 and the gear trains 70 and 84 to the second cone 58. From the second cone 58 the power is transferred through the discs 60 to the first cone 56 which is drivingly connected with the shaft 54. The power transferred through the CVU 20 is also delivered to the friction device 52.

The CVT 14 depicted in FIG. 1 as described has a power split in all ranges. In the second and third forward ranges the CVU 20 always transfers less than the full engine power. As can be seen in FIG. 3, as the vehicle speed is increased for the line 100 to the line 108, the CVU 20 power decreases even though the output power increases. In the third forward range, the CVU 20 power transmission increases at the shift point, as represented as line 108, but then decreased as the vehicle speed is increased toward a maximum value at the line 114. Also during the third forward range, the output power increases slightly as the CVU 20 power decreases. This is indicative of an increase in the overall efficiency of the CVT 14 as the amount of power split to the CVU 20 decreases.

Figure 4:
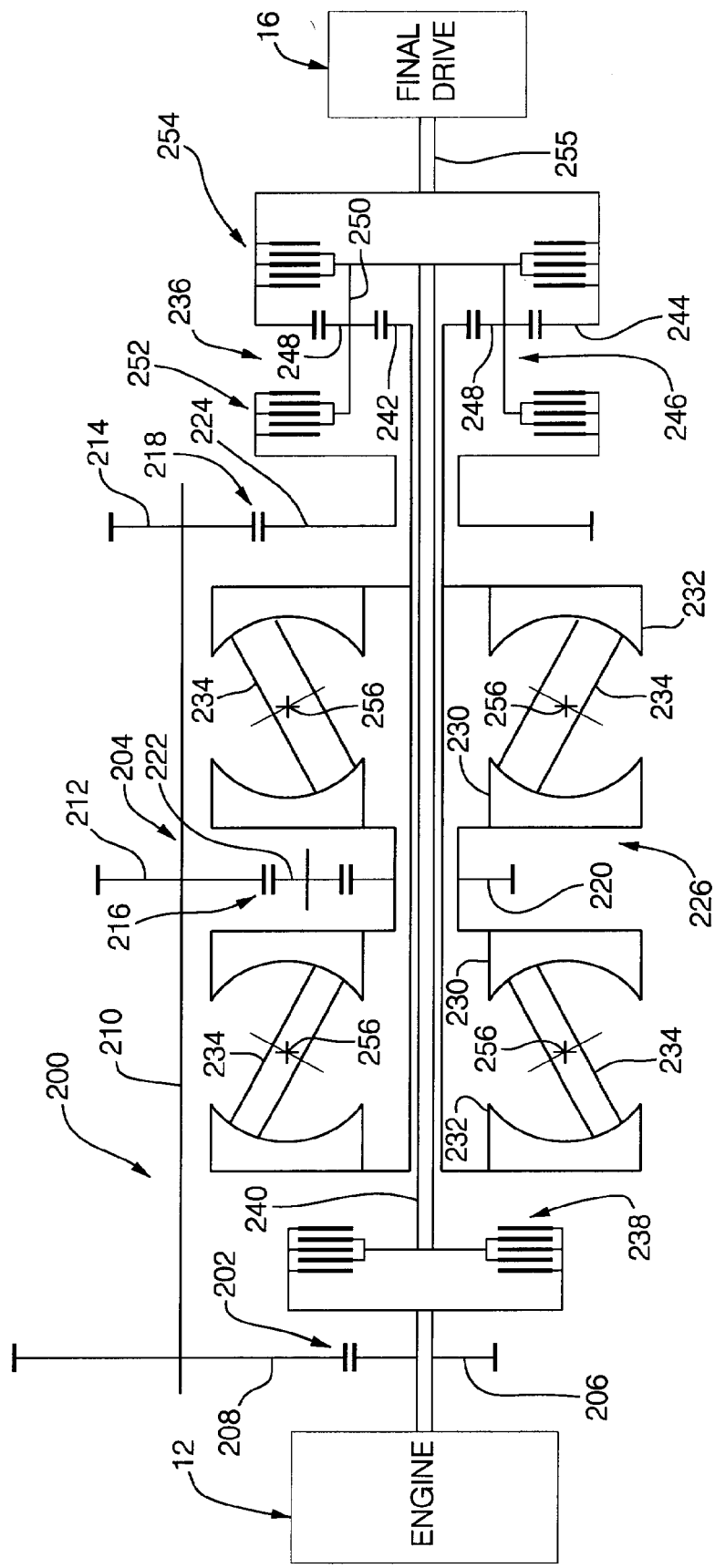
FIG. 4 is schematic representation of an alternative embodiment of a powertrain incorporating the present invention.

An alternative powertrain 200 is seen in FIG. 4. This powertrain 200 includes an engine 12, an input gear train 202, a continuously variable transmission (CVT) 204 and a final drive mechanism 16. The engine 12 and the final drive 16 are conventional mechanism. The input gear train 202 includes a transfer gear 206 driven by the engine 12 and a transfer gear 208 which meshes with the transfer gear 206 and is drivingly connected with a shaft 210. Also connected with the shaft 210 are transfer gears 212 and 214 that are members of gear trains 216 and 218 respectively. The gear train 216 includes a transfer gear 220 and an idler gear 222 disposed in meshing relation between the transfer gears 212 and 220. The gear train 218 includes a transfer gear 224 disposed in meshing relation with the transfer gear 214.

The CVT 204 includes a continuously variable unit (CVU) 226 comprised of first cones 230 and second cones 232 that are frictionally drive connected by a plurality of discs 234. The CVU 226 is similar in construction to the CVU 20. The CVT 204 also has a planetary gear set 236 and a high range friction device 238. The high range friction is a conventional fluid operated, selectively engageable clutch that is connectable between the engine 12 and a central shaft 240. The planetary gear set 236 includes a sun gear member 242, a ring gear member 244 and a carrier assembly member 246. The carrier assembly member 246 has a plurality of pinion gear members 248 rotatably mounted on a cage 250 and disposed in meshing relation between the sun gear member 242 and the ring gear member 244. Also included in the planetary gear set 236 are a pair of friction devices 252 and 254 which are also conventional fluid operated selectively engageable friction clutches. The friction device 252 is selectively connectable between the gear train 218 and the cage 250 of the carrier assembly member 246. The friction device 254 is selectively connectable between the ring gear 244 and the cage 250 of the carrier assembly member 246. The ring gear member 244 is continuously drive connected with an output shaft 255 which is drivingly connected with the final drive mechanism 16.

The discs 234 of the CVU 226 are selectively pivotable on respective axes 256, in a well-known manner, to establish a maximum underdrive ratio of 2.32 and a maximum overdrive ratio of 0.43 between the first cones 230 and the second cones 232. At the maximum underdrive ratio, the discs 234 are frictionally engaged at the inner diameter of the first cones 230 and at the outer diameter of the second cones 232. At the maximum overdrive ratio, the discs 234 are frictionally engaged at the inner diameter of the first cones 230 and at the outer diameter of the second cones 232. The discs can be positioned by a conventional control system not shown. The ratio changes between the maximum underdrive and the maximum overdrive ratios are in infinitely variable steps as is well-known.

Figure 5:
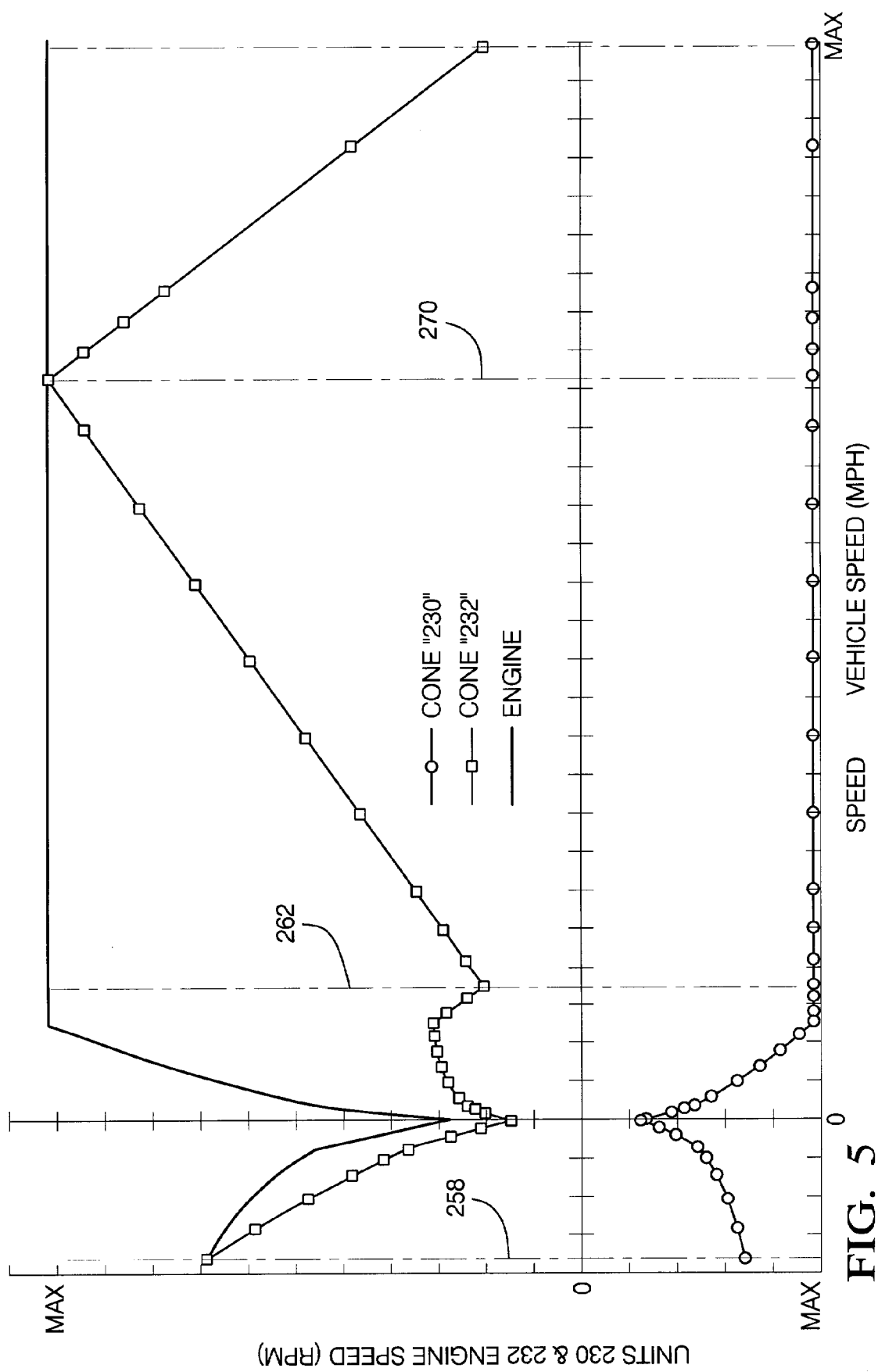
FIG. 5 is a graph depicting the speeds of relative components of the powertrain shown in FIG. 4.
Figure 6:
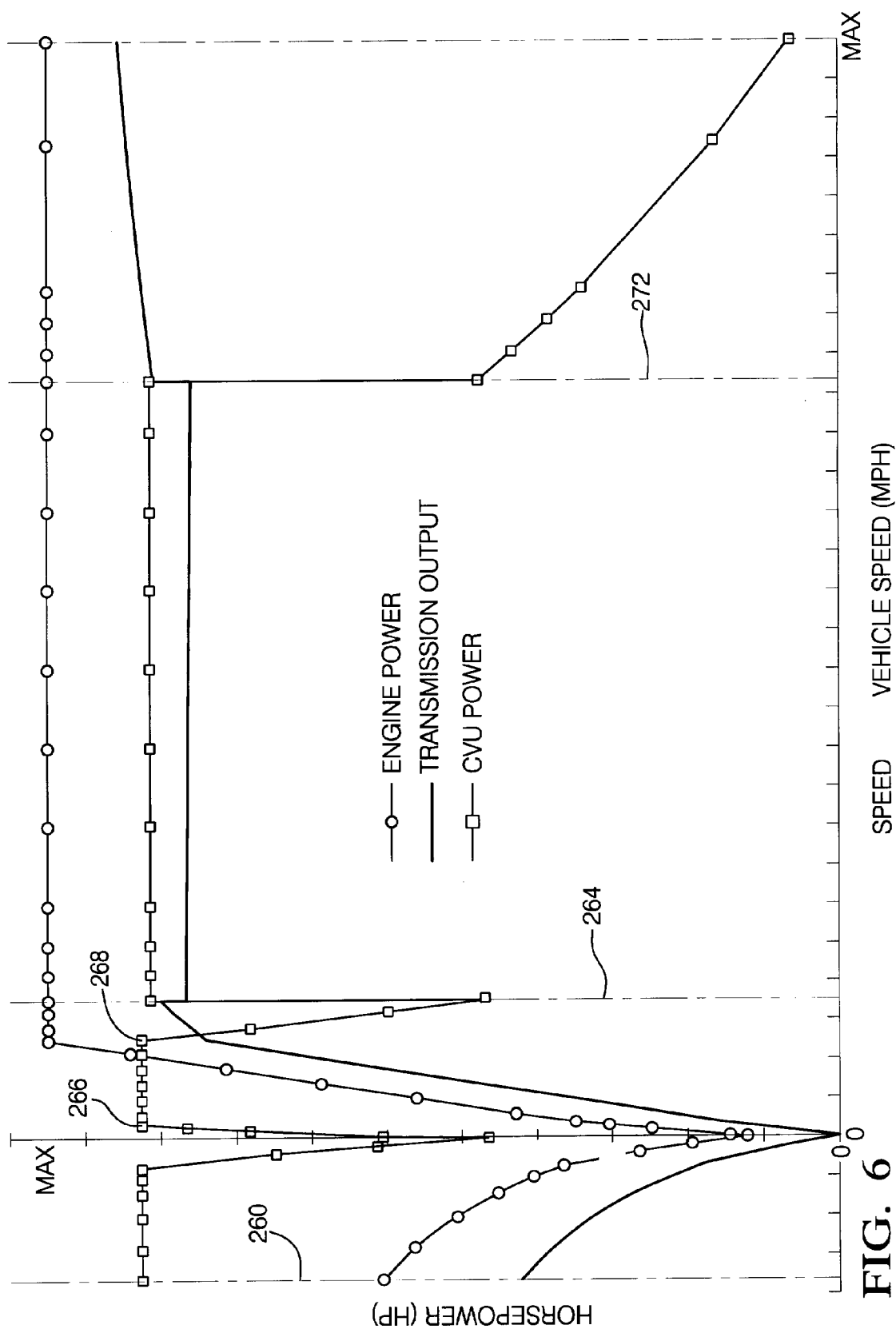
FIG. 6 is a graph depicting the power flow in the powertrain shown in FIG. 4.

The graphs in FIGS. 5 and 6 describe one example of some of the operating characteristics of the powertrain 200. For the example shown the engine is considered to have a maximum operating speed of 5600 rpm and a maximum output power of 210 Hp. The number of teeth on the gear members is shown in the following table.

| Gear Member | No. of Teeth | Gear Member | No of Teeth |
| --- | --- | --- | --- |
| Transfer gear 206 | 29 | Transfer gear 208 | 71 |
| Transfer gear 220 | 35 | Transfer gear 212 | 37 |
| Transfer gear 214 | 33 | Transfer gear 224 | 67 |
| Sun gear 242 | 68 | Ring gear 244 | 116 |

The powertrain 200 has a geared neutral condition similar to the powertrain 10. In the neutral condition, the ratio of the CVU is set at approximately 1.20 and the friction device 252 is engaged. Under this condition, the engine 12 drives the first cones 230 and the second cones 232 drive the sun gear 242. The cage 250 is rotated proportional to the speed of the engine 12. The planetary gear set 236 permits the ring to remain stationary under this condition.

To operate the powertrain 200 in the reverse range, the ratio of the CVU 226 is adjusted toward the maximum underdrive ratio of 2.32 as the speed of the engine is increased from the idle speed. The reverse range output speed increases continuously until the line 258, in FIG. 5, and the line 260, in FIG. 6, are reached. At this point, the powertrain produces the maximum reverse speed when the engine is operated at full throttle. The output speed can be established between idle and the maximum speed by controlling both the speed of the engine (i.e. less than full throttle) and the ratio of the CVU 226. Power is regenerated in the CVU during the reverse range of operation.

To increase the vehicle speed in the low forward range, the engine speed is increased as the CVU ratio is adjusted from the geared neutral value toward the maximum overdrive ratio. The powertrain 200 reaches the maximum low forward range speed at the line 262 in FIG. 5 and the line 264 in FIG. 6. As seen is FIG. 6, the low forward range also produces regenerated of recycled power. The power transferred through the CVU 26 increases to a maximum at point 266 and then decreases from the point 268 until the line 264 is reached. The maximum power regeneration occurs at the point 266.

At the lines 262 and 264, the speed of the carrier assembly member 246 and the ring gear member 244 are equal such that the friction device 254 can be synchronously engaged while the friction device 252 is disengaged. This will establish the second forward range in the powertrain 200. To increase the output speed in the second range, the ratio of the CVO is changed from the maximum overdrive ratio toward the maximum underdrive ratio. The engine speed can remain constant during the second range. If the engine is operating at less than full power, the engine output can be adjusted if the power requirements are increased. Under full power conditions, the maximum vehicle speed will be reached at the line 270 in FIG. 5 and the line 272 in FIG. 6. During the second forward range, all of the engine power is transferred through the CVU 226. The maximum output power of the powertrain 200 will decrease slightly as compared to the maximum output power in the first range due to the overall efficiency decrease when the CVU 226 is transmitting all of the power as compared with the powertrain 10 wherein the second forward range has the advantage of a power split.

To establish the third forward range, the friction device 238 is engaged while the friction device 254 is disengaged. At the range interchange point, the engine 12 and the output shaft 255 are rotating at the same speed thereby permitting a synchronous engagement of the friction device 238. Assuming that the powertrain 200 is operating a t full throttle, the output speed of the vehicle is increased during the third forward range by changing the ratio of the CVU 226 from the maximum underdrive ratio toward the maximum overdrive ratio. When the maximum overdrive ratio is reached, the powertrain 200 will be operating at the lines 274 in FIG. 5 and 276 in FIG. 6. The powertrain 200 operates in a split power mode during the third range. Two features are apparent from FIG. 6, first; the amount of power transmitted through the CVU 226 continually decreases as the output speed increases, and second; the output power increases as the vehicle speed increases. The overall efficiency of the powertrain increase with increasing output speed in the third range. The CVT 204 is considered to be most useful when employed in a vehicle which will be operated, during most of the working cycle at high vehicle speed such as an over the road transporter.

I claim:

1. A powertrain having a prime mover, a continuously variable transmission and a final drive mechanism, said continuously variable transmission comprising:

input gear means drivingly connected with the prime mover;

a continuously variable unit having a neutral ratio condition, a maximum underdrive ratio condition and a maximum overdrive condition, said continuously variable unit being infinitely variable in ratio between said maximum underdrive ratio and said maximum overdrive ratio;

planetary gear means for directing power to the final drive mechanism and for redirecting power to said continuously variable unit during a reverse range and a first forward range, said planetary gear means comprising a planetary gear set having three members, a first of said members being continuously connected with said final drive mechanism, a second of said members being continuously drivingly connected with said continuously variable unit and a third member;

a first selectively engageable friction means being selectively connectable between said input gear means and said third member of said planetary gear set for establishing the reverse range, a neutral condition and the first forward range between said prime mover and said final drive mechanism;

a second selectively engageable friction means for providing a drive connection from both said prime mover and said continuously variable unit directly with said final drive during a second forward range in said powertrain; and a third selectively engageable friction drive means for establishing a third forward drive range incorporating said continuously variable unit in said powertrain.

2. The powertrain defined in claim 1 further comprising: said second selectively engageable friction means establishing said second forward range exclusive of said planetary gear set.

3. The powertrain defined in claim 1 further comprising: said third selectively engageable friction drive means establishing said third forward range exclusively of said planetary gear set.

4. The powertrain defined in claim 1 further comprising:

a first transfer gear train having a first transfer gear drivingly connected with said input gear means and a second transfer gear; and said first selectively engageable friction device comprising a clutch disposed between said second transfer gear and said third gear member of said planetary gear set.

5. The powertrain defined in claim 4 further comprising: said clutch and said planetary gear set transferring power from said first transfer gear train through said second member of said planetary gear set to said continuously variable unit in one of said reverse range and said first forward range, and transferring power from said continuously variable unit through said second member of said planetary gear set to said first transfer gear train.

* * * * *